US009086939B2

(12) United States Patent
Donatelli et al.

(10) Patent No.: US 9,086,939 B2
(45) Date of Patent: Jul. 21, 2015

(54) REACTIVATION OF A SOFTWARE IMAGE FROM A SOURCE MACHINE ONTO A TARGET MACHINE

(75) Inventors: Alessandro Donatelli, Rome (IT); Claudio Marinelli, Rome (IT); Luigi Pichetti, Rome (IT); Roberto Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 13/523,808

(22) Filed: Jun. 14, 2012

(65) Prior Publication Data
US 2013/0007727 A1 Jan. 3, 2013

(30) Foreign Application Priority Data

Jun. 30, 2011 (IT) .............................. MI2011A1210

(51) Int. Cl.
G06F 9/445 (2006.01)
(52) U.S. Cl.
CPC ........................................ G06F 8/63 (2013.01)
(58) Field of Classification Search
CPC .................................................... G06F 8/63
USPC ...................................................... 717/177
See application file for complete search history.

(56) References Cited

U.S. PATENT DOCUMENTS

| 5,555,416 | A | 9/1996 | Owens et al. |
| 6,636,961 | B1 | 10/2003 | Braun et al. |
| 6,678,743 | B1 * | 1/2004 | Glass et al. .................... 719/317 |
| 7,516,206 | B2 | 4/2009 | Henseler et al. |
| 7,764,683 | B2 * | 7/2010 | DiGiorgio et al. ............ 370/390 |
| 7,805,600 | B2 | 9/2010 | Bucher et al. |
| 2003/0037326 | A1 | 2/2003 | Burkhardt et al. |
| 2009/0077551 | A1 | 3/2009 | Whiteley |
| 2009/0180450 | A1 * | 7/2009 | Lyle et al. ..................... 370/338 |
| 2009/0222466 | A1 | 9/2009 | Allison et al. |
| 2010/0223610 | A1 | 9/2010 | Dehaan et al. |
| 2010/0250493 | A1 | 9/2010 | Adkins et al. |

OTHER PUBLICATIONS

Osman et al., "The Design and Implementation of Zap: A System for Migrating Computing Environments", Dec. 2002, USENIX Association, 5th Symposium on Operating Systems Design and Implementation, p. 361-376.*

Konstantinou A., et al., "An Architecture for Virtual Solution Composition and Deployment in Infrastructure Clouds", dated Jun. 15, 2009, pp. 1-9, ACM, Barcelona, Spain.

(Continued)

*Primary Examiner* — Li B Zhen
*Assistant Examiner* — Sen Chen
(74) *Attorney, Agent, or Firm* — David W. Victor; Konrad, Raynes, Davda and Victor LLP

(57) ABSTRACT

Provided are a computer program product, system and method for reactivation of a software image from a source machine onto a target machine. Discovery is made of a static software application in the software image listening on a corresponding selected communication channel of the source address. Listening is performed on behalf of the static software application on the corresponding selected communication channel of the target address. An inbound message directed to the selected communication channel of the target address is redirected to the corresponding static software application on the selected communication channel of the source address.

23 Claims, 8 Drawing Sheets

(56) References Cited

OTHER PUBLICATIONS

Zackrisson C. et al., "OpenLabs Security Laboratory—The Online Security Experiment Platform", vol. 4, dated Jul. 2008, pp. 1-6, Ronneby Sweden.

"Cloning and Copying VirtualBox Virtual Machines", Online, (retrieved on Jun. 14, 2012), retrieved from the internet at URL: http://srackham.wordpress.com/cloning-and-copying-virtualbox-virtual-machines/, pp. 1-34.

* cited by examiner

REACTIVATION OF A SOFTWARE IMAGE FROM A SOURCE MACHINE ONTO A TARGET MACHINE

CROSS-REFERENCE TO RELATED FOREIGN APPLICATION

This application is a non-provisional application that claims priority benefits under Title 35, United States Code, Section 119(a)-(d) from Italian Patent Application entitled "DYNAMIC RE-ACTIVATION OF SOFTWARE IMAGES" by Luigi PICHETTI, Claudio MARINELLI, Roberto RAGUSA, and Alex DONATELLI, having Italian Patent Application No. MI2011A001210, filed on Jun. 30, 2011, which Italian Patent Application is incorporated herein by reference in its entirety.

BACKGROUND OF THE INVENTION

1. Field of the Invention

The present invention relates to a computer program product, system and method for reactivation of a software image from a source machine onto a target machine.

2. Description of the Related Art

Deployment of software images is a commonplace activity in modern data-processing systems. A software image is a snapshot of a software structure that is installed on a mass memory of a machine. In particular, the software image of a virtual appliance comprises the definition of one or more virtual machines (i.e., emulations by software of physical machines) with a corresponding software appliance. The software appliance comprises one or more software applications (i.e., software programs performing specific user tasks) and corresponding Just Enough Operating Systems, or JeOSs (i.e., limited operating systems specifically tailored to support the software applications), which are encapsulated in a pre-built, self-contained unit. Virtual models may also be defined for composing software images, with the use of a port abstraction to negotiate their communication parameters, as described in "An Architecture for Virtual Solution Composition and Deployment in Infrastructure Cloud—Alexander V. Konstantinou, VTDC'09, Jun. 15, 2009, Barcelona, Spain" the entire disclosure of which is herein incorporated by reference in its entirety.

The software images allow provisioning the corresponding software structures in a simple and fast way. This is especially useful in cloud computing environments where multiple services are provided on demand. Moreover, the software images may be used for disaster recovery purposes (such as described in United States Patent Application No. 2009/0222466, the entire disclosure of which is herein incorporated by reference in its entirety) or for implementing remote security laboratories (such as described in "OpenLabs Security Laboratory—The Online Security Experiment Platform, J. Zackrisson et al., Blekings Institute of Technology/School of engineering, Ronneby, Sweden", the entire disclosure of which is herein incorporated by reference in its entirety).

The process of deploying software images typically involves the preparation of a reference machine with the installation of an operating system and any additional software applications on top of it. A software image of the reference machine is then captured and stored into a shared repository, from which it may be copied and instantiated onto any desired target machines. Alternatively, the software image is directly migrated to the target machines from peer machines.

In any case, the software image (as captured on a source machine consisting of either the reference machine or the peer machine) often needs to be properly customized for working on the target machine, such as the assignment of a different address or hostname.

However, some software applications of the software image may have a source address and/or a source hostname embedded in their private data. Therefore, these software applications are unable to work on the target machine with a different target address and/or target hostname. Typical examples are software applications implementing server-side services (for example, database servers or application servers), which are listening for inbound requests on a hard-coded address or on an address mapping a hard-coded hostname.

The technique commonly used for addressing this problem is based on a re-activation process of the software image on the target machine (as briefly mentioned in the above-cited U.S. Patent Application No. 2009/0222466 as well). For this purpose, the software applications are introspected to determine whether any source address and/or source hostname are embedded in their private data. The source address and/or the source hostname are then replaced with the target address and the target hostname, respectively (either manually or by means of suitable scripts that are executed automatically at a first bootstrap of the target machine).

However, although this re-activation process may be quite trivial in specific situations (for example, for an operating system), in other situations it may be tedious, time-consuming and prone to errors (for example, for complex software applications). Moreover, in certain situations, the re-activation process may be unable to retrieve and update the source address and/or the source hostname embedded in the software applications. This may happen when the software applications have an unknown structure (for example, legacy software applications), or when this information is not accessible from the outside (for example, because stored in encrypted form).

SUMMARY

Provided are a computer program product, system and method for reactivation of a software image from a source machine onto a target machine. Discovery is made of a static software application in the software image listening on a corresponding selected communication channel of the source address. Listening is performed on behalf of the static software application on the corresponding selected communication channel of the target address. An inbound message directed to the selected communication channel of the target address is redirected to the corresponding static software application on the selected communication channel of the source address.

BRIEF DESCRIPTION OF THE DRAWINGS

The solution according to one or more embodiments of the invention, as well as further features and the advantages thereof, will be best understood with reference to the following detailed description, given by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

The described embodiments are based on the idea of re-activating software images dynamically.

Described embodiments provide a method for re-activating a software image (which has been captured on a source machine having a source address) on a target machine having a target address. Each static software application (comprised in the software image) that is listening on a corresponding selected communication channel of the source address (for example, a source socket identified by an internal alias for the source address pointing to the target address and a selected port number) is discovered (for example, by means of a watchdog that is activated at the bootstrap of the target machine and possibly periodically later on). The method continues by listening on behalf of each static software application on the corresponding selected communication channel of the target address (for example, by a broker with which the source socket of each static software application has been registered by the watchdog after its discovering). Each inbound message, being directed to each selected communication channel of the target address, is re-directed to the corresponding static software application on the selected communication channel of the source address (for example, by the broker that translates the target socket into the corresponding source socket).

Further embodiments provide a method for deploying a software image. The software image is captured on a source machine. At least one software component for performing the above described method for re-activating the software image is injected into the software image (for example, the watchdog and the broker). The software image is then deployed onto a target machine.

In further embodiments, a computer program comprising code means causes a data-processing system (for example, a target machine or a deployment server) to perform the above described method for activating the software image and/or method for deploying the software image.

In a further embodiment, a computer program product comprising a non-transitory computer readable medium embodies a computer program comprising code means that is directly loadable into a working memory of a data-processing system thereby configuring the data-processing system to perform the above described methods.

In a yet further embodiment, a system (for example, a target machine or a deployment server) performs the above described method for activating the software image and/or method for deploying the software image.

Figure 1:
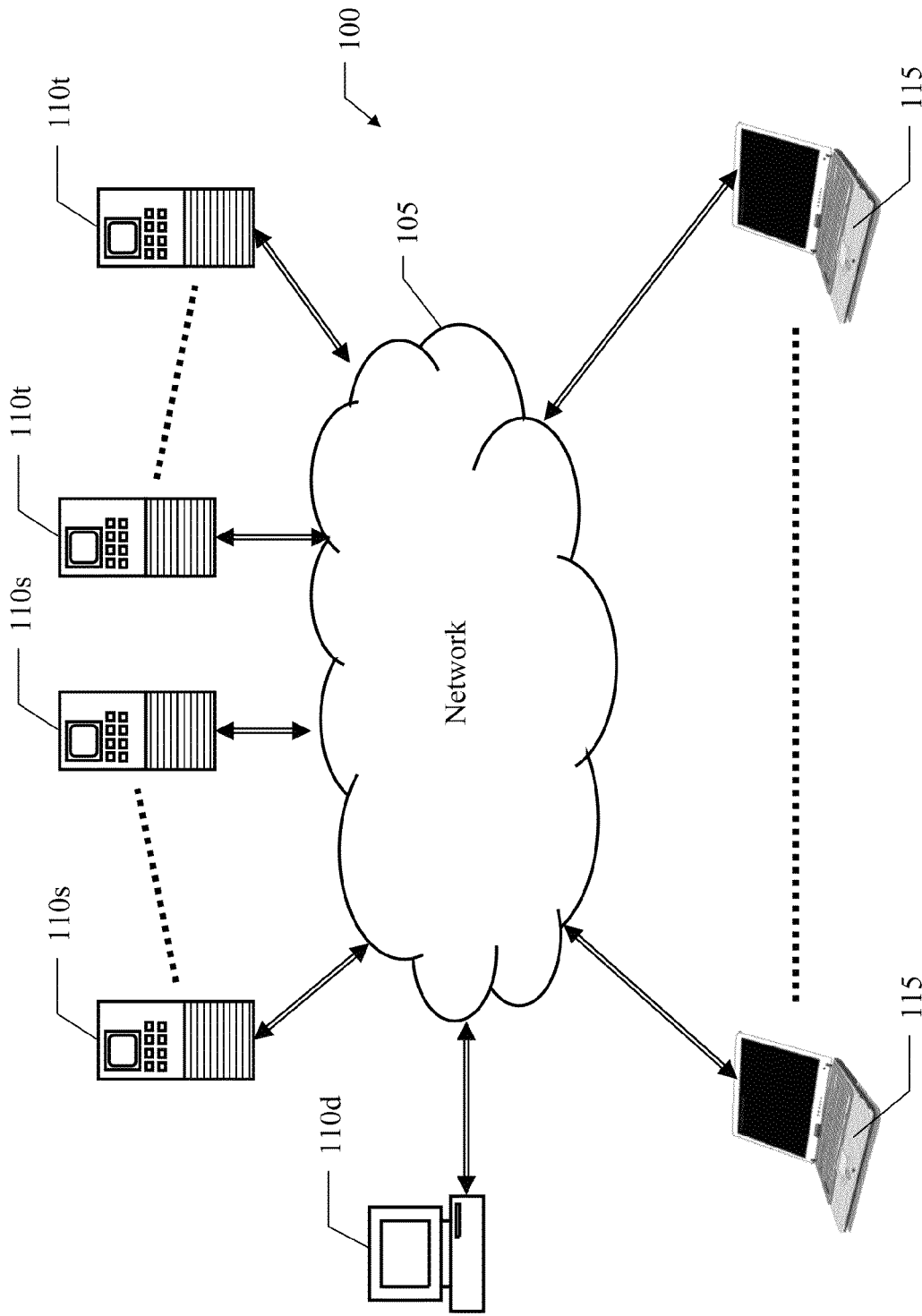
FIG. 1 shows a pictorial representation of a data-processing infrastructure according to described embodiments.

FIG. 1 provides a pictorial representation of a data-processing infrastructure 100 in which the embodiments are applicable. The data-processing infrastructure 100 has a distributed architecture, which is based on a network 105, such as the Internet. Multiple physical and/or virtual machines are connected through the network 105. Particularly, a deployment server machine (or simply deployment server) 110d controls the deployment of software images. The software images are deployed to target server machines (or target servers) 110t from source server machines (source servers) 110s consisting of reference machines or peer machines. Each software image (e.g., a virtual appliance) is a snapshot of a software structure (e.g., comprising the definition of a virtual machine, its operating system and one or more software applications) that is installed on the corresponding source server 110s. Client machines (or simply clients) 115 access the target servers 110t for exploiting any services provided by them.

Figure 2:
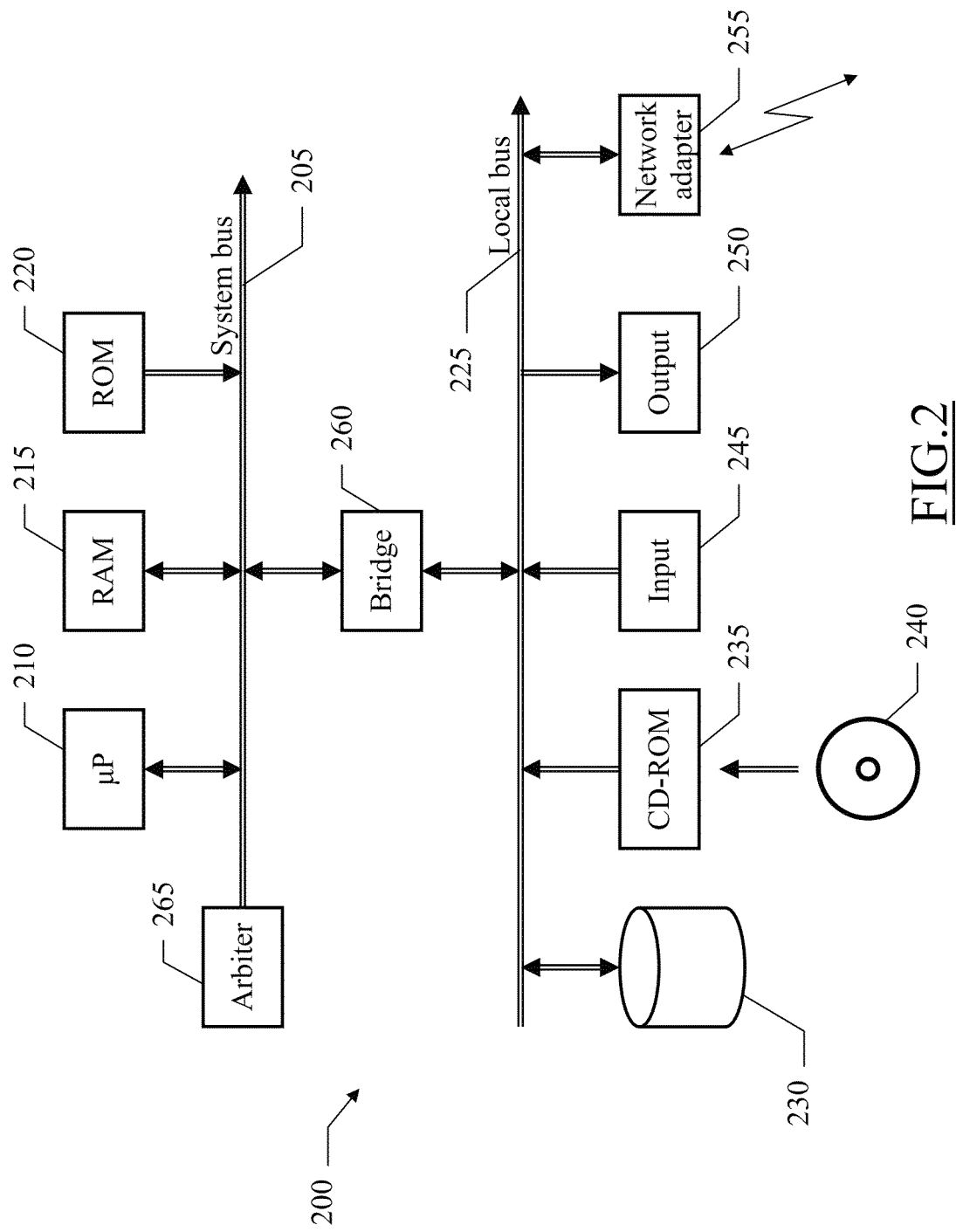
FIG. 2 shows a schematic block diagram of a generic computer of the data-processing infrastructure in FIG. 1.

FIG. 2 comprises a schematic block diagram of a generic computer 200 of a data-processing infrastructure. The computer 200 (used to implement the above-mentioned physical or virtual machines) is formed by several units that are connected in parallel to a system bus 205 (with a structure that is suitably scaled according to the actual function of the computer 200 in the data-processing infrastructure). In detail, one or more microprocessors (μP) 210 control operation of the computer 200. A RAM 215 is used as a working memory by the microprocessors 210 and a ROM 220 stores basic code for a bootstrap of the computer 200. Several peripheral units are clustered around a local bus 225 (by means of respective interfaces). Particularly, a mass memory comprises one or more hard disks 230 and drives 235 for reading DVD- or CD-ROMs 240. Moreover, the computer 200 comprises input units 245 (e.g., a keyboard and a mouse), and output units 250 (e.g., a monitor and a printer). A network adapter 255 is used to plug the computer into the data-processing infrastructure. A bridge unit 260 interfaces the system bus 205 with the local bus 225. Each microprocessor 210 and the bridge unit 260 may operate as master agents requesting an access to the system bus 205 for transmitting information. An arbiter 265 manages the granting of the access with mutual exclusion to the system bus 205.

An exemplary embodiment is shown in the FIG. 3A-FIG. 3E.

Figure 3A:
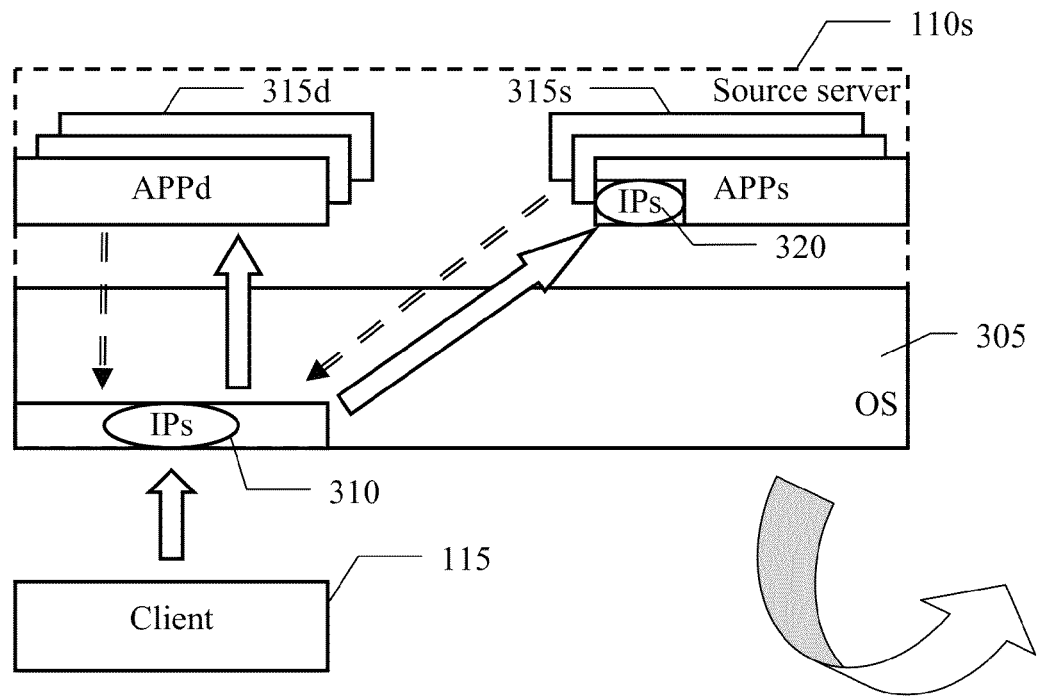
FIG. 3A through FIG. 3E show an exemplary scenario of application of the embodiments.
Figure 3B:
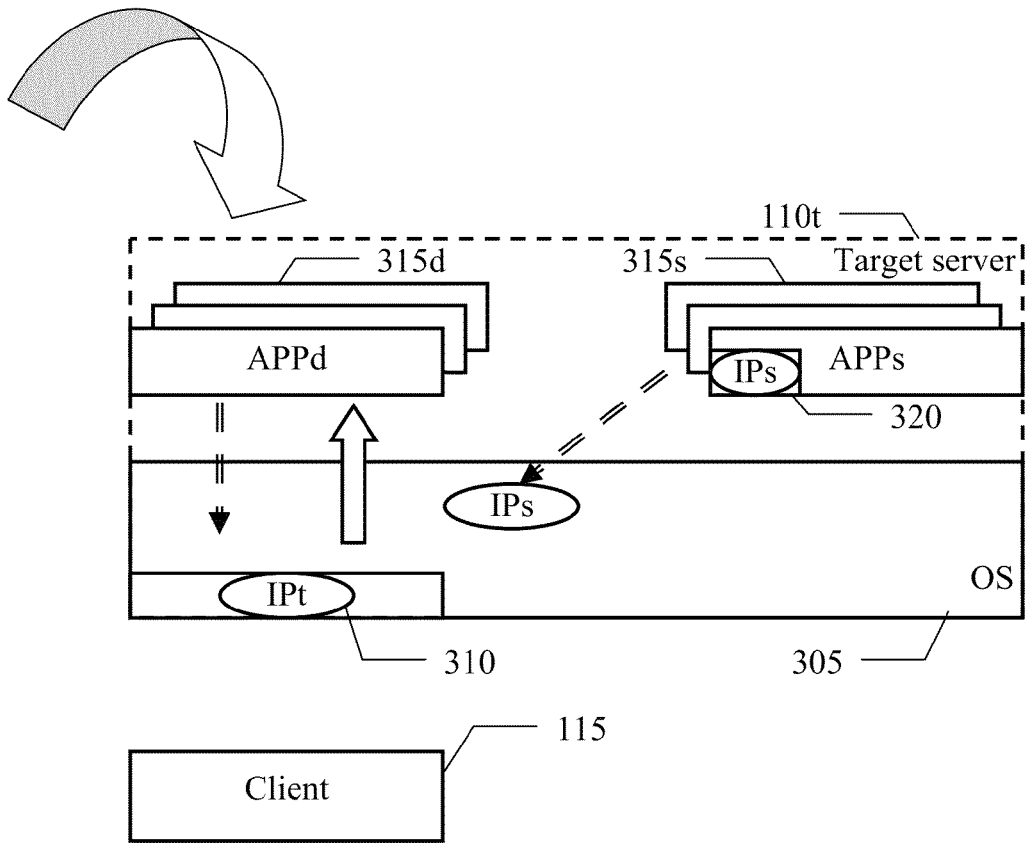

In FIG. 3A, a generic source server 110s comprises an operating system (OS) 305 that provides a software platform implementing the basic functions of the source server 110s. Particularly, the operating system 305 comprises a networking module 310 that controls all the network communications of the source server 110s. For this purpose, the source server 110s is assigned a network address (e.g., an IP address), referred to as source address IPs. The source server 110s may comprise one or more dynamic software applications 315d (APPd). The dynamic software applications 315d fetch the source address IPs from the operating system 305 whenever they need to implement a network communication. In further embodiments, the source server 110s may also comprise one or more static software applications 315s (APPs). The static software applications 315s instead have the source address IPs that is embedded in their private data 320.

The (dynamic and static) software applications 315d, 315s are designed to serve inbound requests submitted to the source server 110s by any generic client 115. For this purpose, each software application 315d, 315s is listening on a corresponding selected communication channel of the source address IPs (fetched dynamically by the dynamic software applications 315d or retrieved from their private data 320 by the static software applications 315s), such as a socket identified by the source address IPs and a selected port number (hereinafter referred to as source socket). Whenever the client 115 submits a connection request to a selected software application 313d,315s (by sending a corresponding inbound message to its source socket), the network module 310 forwards the inbound message to the corresponding software application 315d,315s that serves it.

A software image of the source server 110s (comprising the operating system 305 and the software applications 315d, 315s) is captured for its cloning. Moving to the FIG. 3B, the software image is deployed onto a different target server 110t. Once the software image has been installed onto the target server 110t, it is customized for working correctly on it. Particularly, the target server 110t may be assigned a different IP address (hereinafter referred to as target address IPt).

The dynamic software applications 315d work correctly on the target server 110t as above. Indeed, each dynamic software application 315d fetches the target address IPt from the operating system 305, and then listens on a corresponding socket identified by the target address IPt and the same port number (hereinafter referred to as target socket).

Conversely, the static software applications 315s would be unable to work on the target server 110t. Indeed, in this case the static software applications 315s again retrieve the source address IPs from their private data 320, so that they cannot listen on any valid socket of the target server 110t (comprising the target address IPt). Therefore, when the client 115 submits a connection request to a selected static software application 315s (by sending a corresponding inbound message to the target socket comprising the target address IPt and the same port number), this inbound message is never served because no software application is listening on the target socket.

Figure 3C:
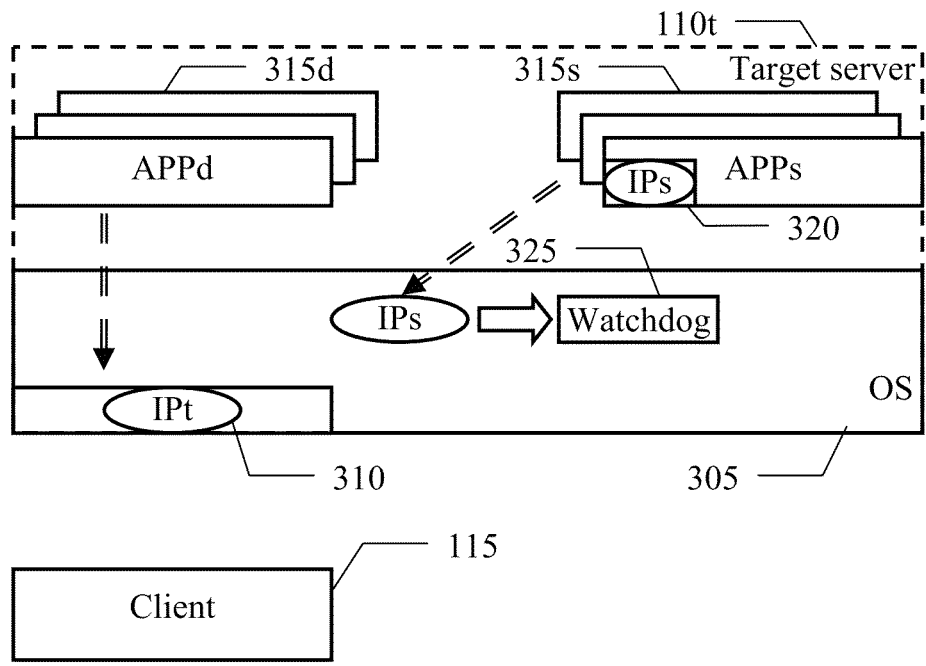

In described embodiments, as shown in FIG. 3C, each static software application 315s listening on a source socket is discovered (for example, by means of a watchdog 325 that watches the software applications listening on any sockets comprising an internal alias for the source address IPs—e.g., implemented on the internal loop-back interface—pointing to the target address IPt).

Figure 3D:
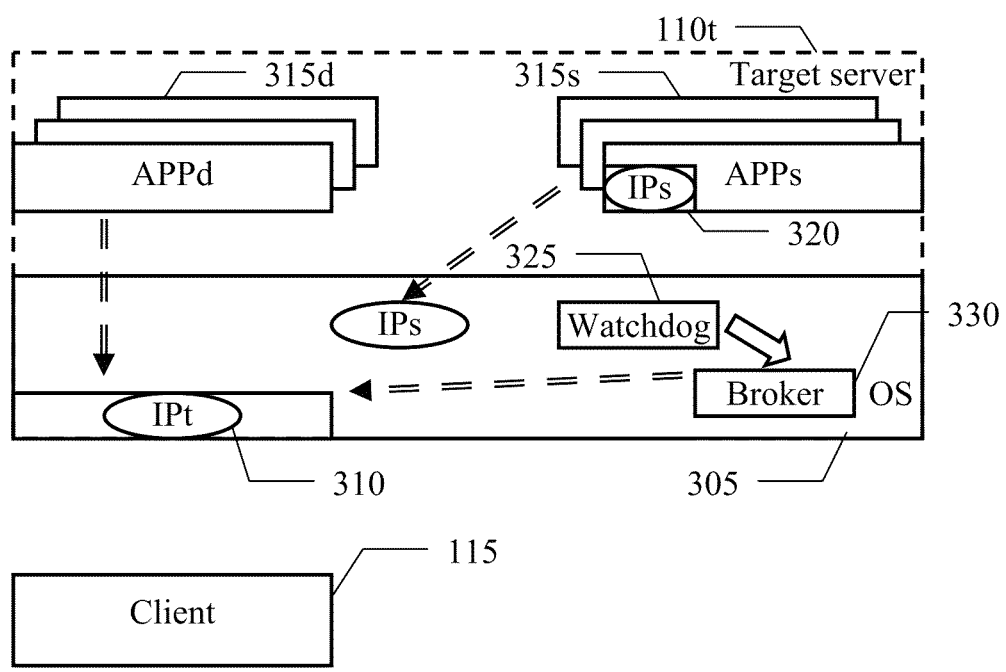

With respect to FIG. 3D, for each static software application 315s so discovered (listening on a corresponding source socket comprising the source address IPs and a selected port number), a component listens on behalf of the static software application 315s on the corresponding target socket comprising the target address IPt and the same port number, such as a broker 330 with which the source socket has been registered by the watchdog 325.

Figure 3E:
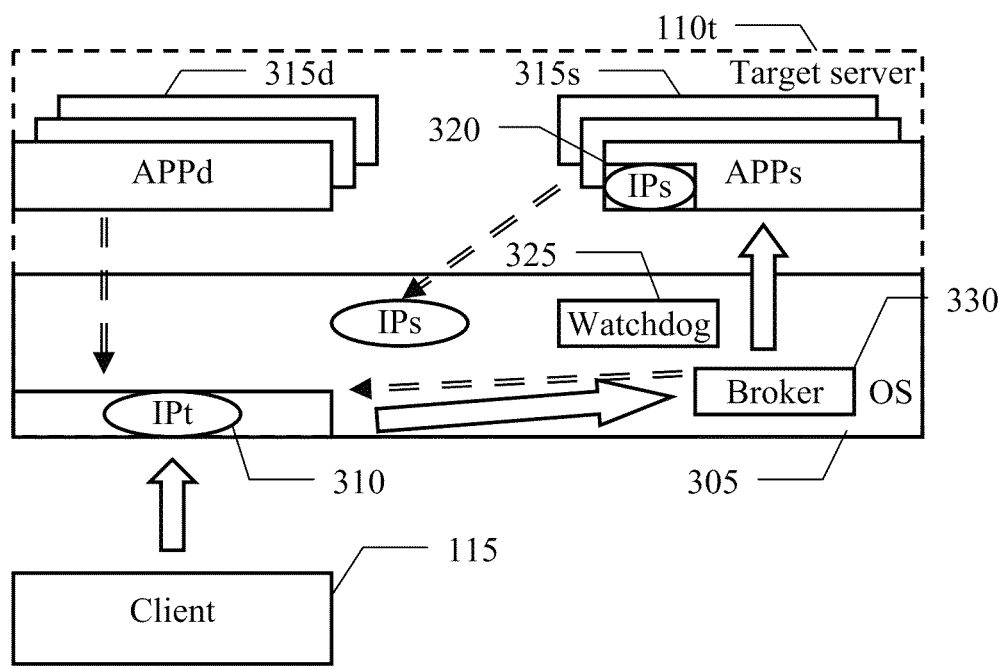

In this way, as shown in the FIG. 3E, when a connection request is submitted by the client 115 to a selected static software application 315s (by sending a corresponding inbound message to its target socket), the networking module 310 forwards the inbound message to the broker 330. The broker 330 then re-directs the inbound message to the corresponding static software application 315s (for example, by translating the target socket into the corresponding source socket) that serves it as above.

In this way, the software image is re-activated automatically on the target server 110t, without requiring any introspection of the static software applications 315s. Therefore, the desired result is achieved without any manual or scripting operation. This makes the re-activation of the software image simple, fast and safe. Moreover, these benefits are possible in any condition, independently of the complexity and knowledge of the static software applications 315s, and even when the source address embedded therein is not accessible from the outside (for example, because stored in encrypted form).

At the same time, the described embodiments do not impact the operation of the dynamic software applications 315d (since no additional action is performed in respect thereto). Therefore, the performance of the dynamic software applications 315s may be unaffected by the operations that are performed to make the static software applications 315s work correctly.

Figure 4A:
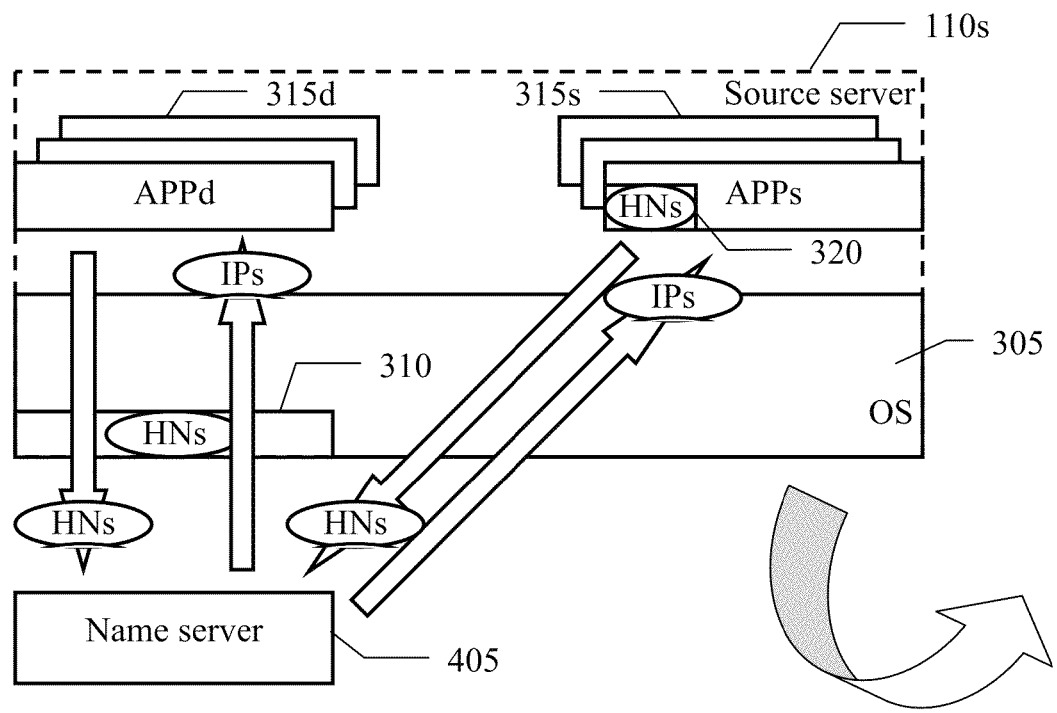
FIG. 4A through FIG. 4C show an exemplary scenario of application of the embodiments.
Figure 4B:
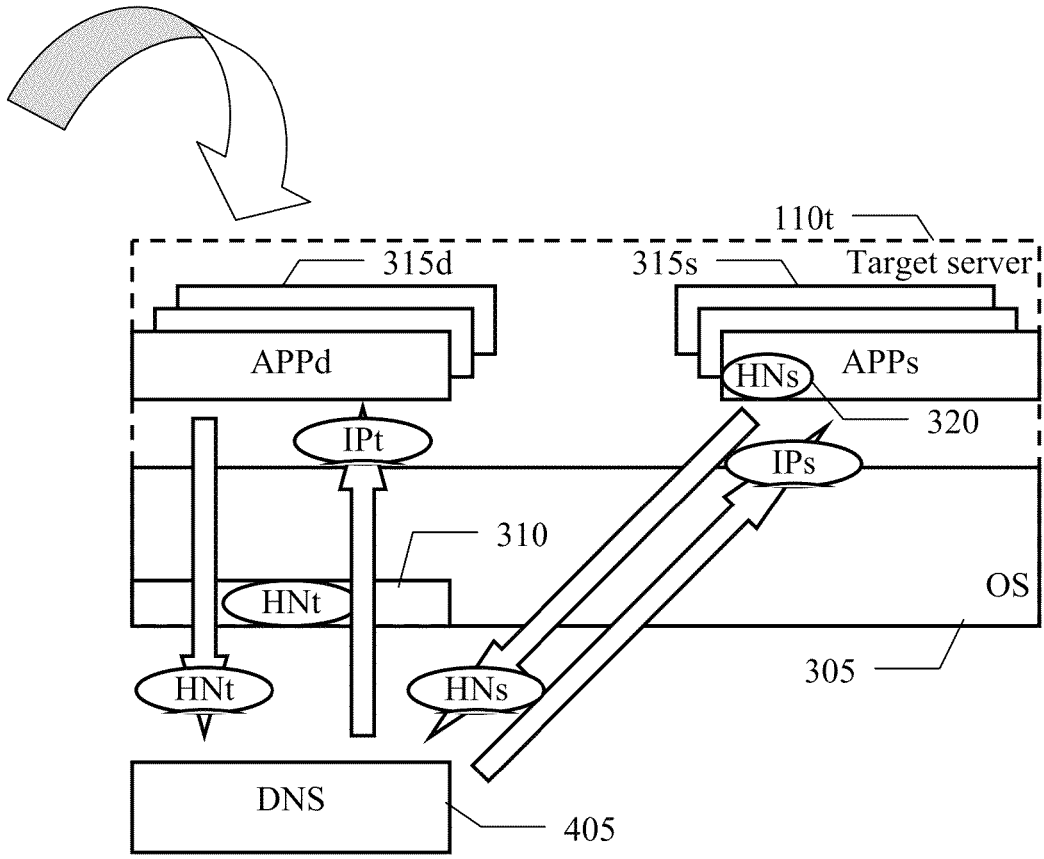
Figure 4C:
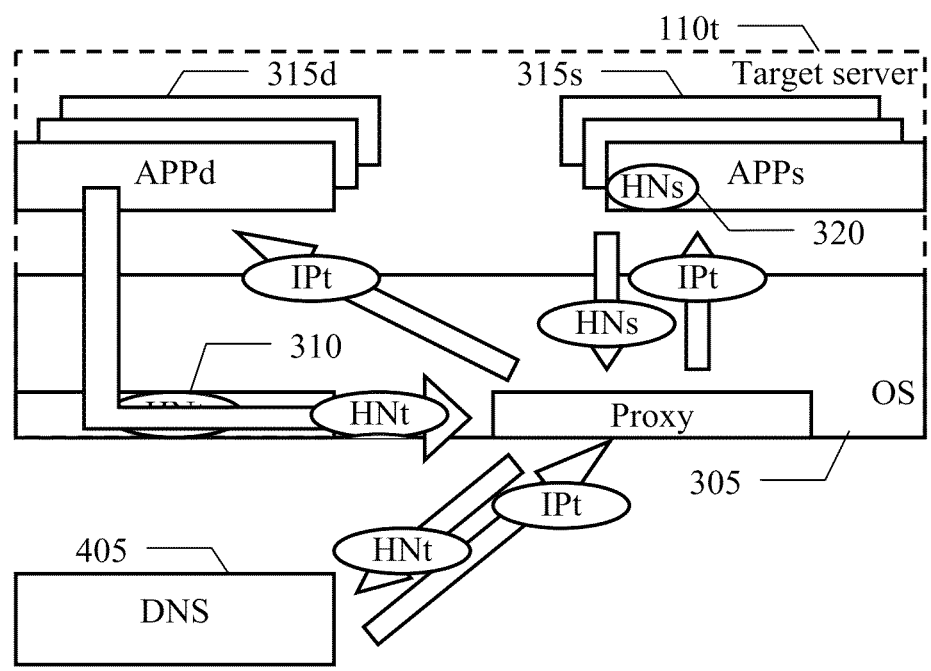

A further embodiment is shown in FIG. 4A through FIG. 4C.

Starting from the FIG. 4A, the source server 110a is also assigned a network hostname (for example, a domain name)—hereinafter referred to as source hostname HNs. The dynamic software applications 315d fetch the source hostname HNs from the operating system 305, whereas the static software applications 315s have the source hostname HNs embedded in their private data 320. Whenever the (dynamic and static) software applications 315d,315s need to implement a network communication, they submit a mapping query for the source hostname HNs to a name server 405 (for example, a Domain Name Server, or DNS). In response thereto, the name server 405 returns the corresponding source address IPs. The operation of the software applications 315d, 315s is then as described above.

With respect to FIG. 4B, when the software image of the source server 110s is deployed onto the target server 110t, a different hostname (hereinafter referred to as target hostname HNt) may be assigned thereto. The dynamic software applications 315d work correctly on the target server 110t as above. Indeed, each dynamic software application 315d fetches the target hostname HNt from the operating system 305, and obtains the corresponding target address IPt from the name server 405.

Conversely, the static software applications 315s would be unable to work on the target server 110t. Indeed, in this case as well the static software applications 315s retrieve the source hostname HNs from their private data 320, so that they again obtain the source address IPs from the name server 405.

In the embodiment shown in FIG. 4C, every mapping query submitted by the (dynamic and static) software applications 315d,315s is intercepted—for example, by a proxy name server 410. The proxy name server 410 replaces the source hostname HNs (in the mapping query from the static software applications 315s) with the target hostname HNt. The mapping query (always relating to the target hostname HNt) is forwarded to the name server 410, which then returns the target address IPt.

In this embodiment as well, the software image is re-activated automatically on the target server 110t, without requiring any introspection of the static software applications 315s (and then any manual or scripting operation). This makes the re-activation of the software image simple, fast and safe. Moreover, this is possible in any condition, independently of the complexity and knowledge of the static software applications 315s (even when the source hostname embedded in the static software applications 315s is not accessible from the outside).

Figure 5:
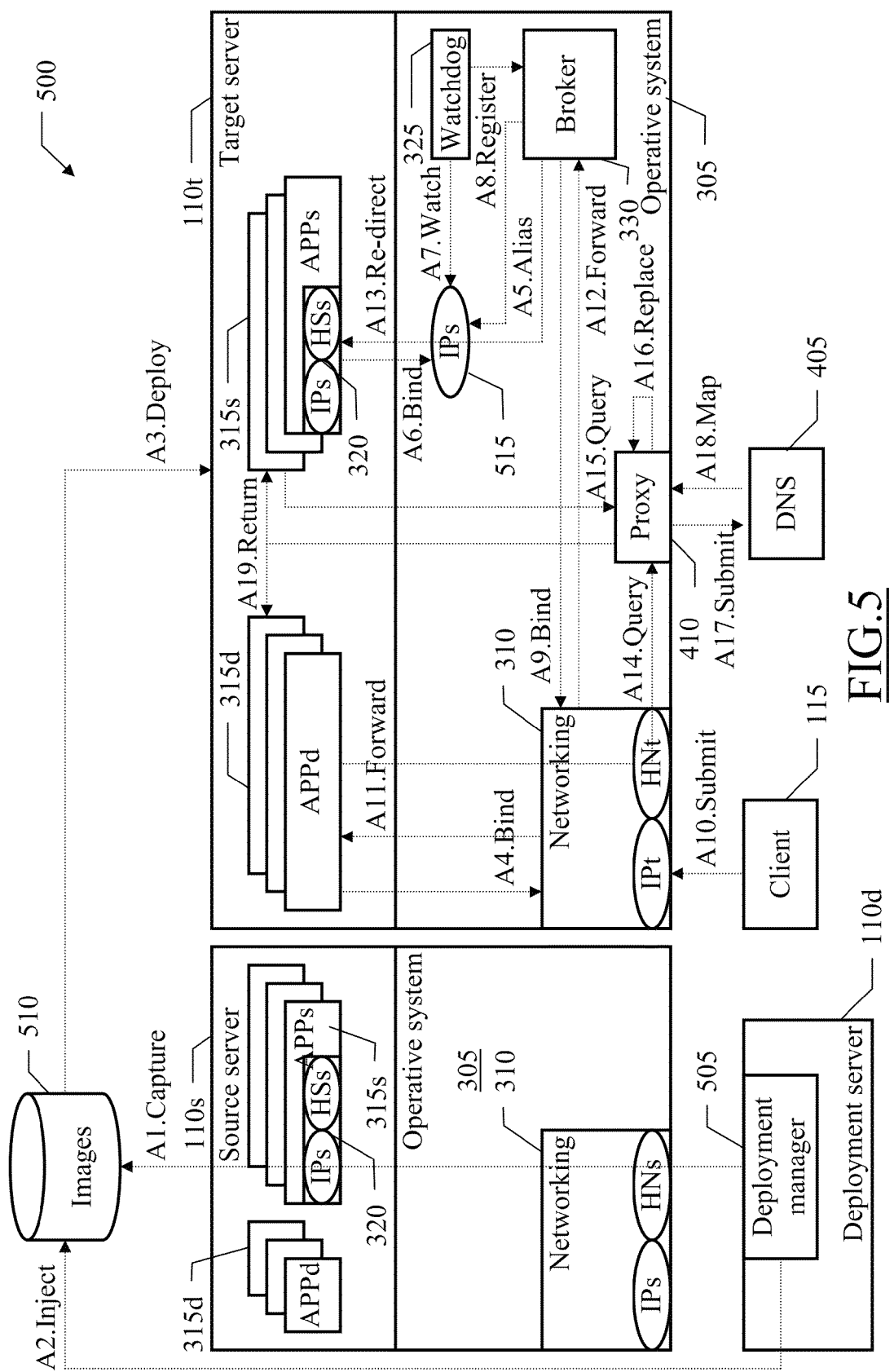
FIG. 5 shows a collaboration diagram representing the roles of the main software components that may be used to implement the embodiments.

A collaboration diagram representing the roles of the main software components that may be used to implement the embodiments is shown in the FIG. 5. These software components are denoted as a whole with the reference 500. The information (programs and data) is typically stored in the hard disk and loaded (at least partially) into the working memory of each machine when the programs are running The programs are initially installed onto the hard disk, for example, from DVD-ROM or from the network (not shown in the figure). Particularly, the figure describes both the static structure of the software components and their dynamic behavior (by means of a series of exchanged messages, each one representing a corresponding action, denoted with sequence numbers preceded by the symbol "A").

Starting from the deployment server 110d, a deployment manager 505 (for example, the IBM TIVOLI PROVISIONING MANAGER (TPM) by International Business Machines Corporation (IBM)) is used to automate the deployment of software images remotely from the source servers 110s onto the target servers 110t. A software image of a selected source server 110s (comprising its operating system 305, dynamic software applications 315d and/or static software applications 315s) is captured and stored into a shared repository 510. Each static software application 315s has the source address IPs and/or the source hostname HNs of the source server 110t that is embedded in its private data 320 (such as a configuration file or database). For example, this information has been captured and saved during a set-up of the static software application 315s (action "A1.Capture"). In described embodiments, the deployment manager 505 also injects one or more software components required to its implementation into each software image comprising at least one static software application 315s. Particularly, the deployment manager 505 injects the watchdog 325, the broker 330 and/or the proxy name server 410 (with commands for causing their automatic instantiation). The broker 330 is configured with the source address IPs and the proxy name server 410 is configured with the source hostname HNs, which have been previously saved during the capturing of the software image on the source sever 110s (action "A2.Inject"). The deployment manager 505 then controls the deployment of any selected software image from the repository 510 onto any selected target server 110t—for example, by booting the target server 110t over the network and then downloading the software image thereon (action "A3.Deploy"). IBM and TIVOLI are trademarks of IBM in the United States and other countries).

In this phase, the software image is also customized (if necessary) for working on the target server 110t. Particularly, the target server 110t may be assigned a different target address IPt to uniquely address it within a corresponding network domain (for example, when the address is static and both the source server 110s and the target server 110t belong to the same network domain, or when a specific addressing scheme applies to the target server 110t). It is also possible to change the type of address from static (on the source server 110s) to dynamic (on the target server 110t). In this case, the target address IPt is assigned automatically whenever the target server 110t boots—for example, by a Dynamic Host Configuration Protocol (DHCP) service—and it is generally different from the source address IPs. Moreover, the target server 110t may be assigned a different target hostname HNt to uniquely identify it within the corresponding network domain (for example, when both the source server 110s and the target server 110t belong to the same network domain, or when a specific naming convention applies to the target server 110t).

Each (dynamic and static) software application 315d,315s binds on a corresponding socket (for serving inbound messages addressed thereto). Each socket defines a communication endpoint of a virtual connection that is identified by an IP address and a port number (which indicates a selected logical communication channel on the IP address).

Each dynamic software application 315d fetches the target address IPt from the operating system 305, and binds on a corresponding target socket identified by the target address IPs and a port number PORTd that is reserved thereto (IPt: PORTd). The dynamic software application 315d then remains listing on its target socket IPt:PORTd for any inbound message sent thereto (action "A4.Bind").

The broker 330 (automatically instantiated at the bootstrap of the target server 110t) creates an internal alias 515 for the source address IPs (indicated in its configuration) pointing to the target address IPt (fetched from the operating system 305)—action "A5.Alias". The internal alias 515 is visible only internally to the target server 110t (wherein it may be used as a valid IP address), but it is not visible outside it (to avoid creating any network conflict with the source server 110s). Each static software application 315s retrieves the source address IPs from its private data 320, and binds on a corresponding source socket identified by the internal alias for the source address IPs and a selected port number PORTs that is reserved thereto (IPs:PORTs). The static software application 315s then remains listing on its source socket IPs:PORTs for any inbound message sent thereto (action "A6.Bind"). The internal alias for the source address IPs allows the static software applications 315 to start correctly even on the target server 110t with the target address IPt. However, the static software applications 315s cannot receive yet any inbound messages (since they are always sent to the corresponding target sockets IPt:PORTs).

The watchdog 325 (automatically instantiated at the bootstrap of the target server 110t) watches the internal alias for the source address IPs, in order to discover each static software application 315s that has newly bound on the corresponding source socket IPs:PORTs (action "A7.Watch"). For this purpose, the watchdog 325 scans all the port numbers on the source address IPs. The operation may be performed at the bootstrap of the target server 110t to allow for discovering all the static software applications 315s in most practical situations, since they are generally instantiated at the bootstrap of the target server 110t, with a minimal impact on its operation. In addition or in alternative, the same operation may be performed periodically (for example, every 15-30 sec.) to allow for discovering any further static software application 315s that is instantiated later on. The watchdog 325 registers the source socket (IPs:PORTs) of each static software application 315s that has been discovered to the broker 330 (action "A8.Register"). The broker 330 binds on the corresponding target socket, which is identified by the target address IPt (fetched from the operating system 305) and the same port number PORTs (i.e., IPt:PORTs). The broker 330 then remains listing on this target socket IPt:PORTs on behalf of the corresponding static software application 315s for any inbound message sent thereto (action "A9.Bind").

A generic client 115 accesses the target server 110t (for example, by means of a browser not shown in the figure). Particularly, the client 115 submits a connection request to the target server 110t by sending an inbound message comprising an indication of a corresponding target socket (with the target address IPt and the port number of a selected software application 315d,315s) in its header (action "A10.Submit"). The target address IPt is used to route the inbound message from the client 115 to the target server 110t over the network (not shown in the figure). Once the inbound message has been received by the networking module 310 of the target server 110t, it is forwarded to the entity listening on its socket. Therefore, each inbound message comprising a target socket IPt:IPORTd on which a dynamic software application 315d is listening is forwarded to it directly as usual (action "A11.Forward"). On the other hand, each inbound message comprising a target socket IPt:IPORTs on which the broker 330 is listening is forwarded to it (action "A12.Forward"). The broker 330 translates the target socket IPt:PORTs of the inbound message into the corresponding source socket IPs: PORTs, by replacing the target address IPt with the source address IPs that is registered for the same port number PORTs. For example, this result may be achieved by exploiting a Network Address Translation (NAT) service, which modifies the socket in the header of the inbound message accordingly. The inbound message is then re-directed to the static software application 315s that is listening on this static socket IPs:PORTs (action "A13.Re-direct").

In addition or in alternative, each dynamic software application 315d may submit a mapping query for the target hostname HNt that is fetched from the operating system 305

(action "A14.Query"). Likewise, each static software application 315s may submit a mapping query for the source hostname HNs that is retrieved from its private data 320 (action "A15.Query"). In both cases, the mapping query is intercepted by the proxy name server 410 (automatically instantiated at the bootstrap of the target server 110t). The proxy name server 410 replaces the source hostname HNs (indicated in its configuration) of each mapping query relating thereto with the target hostname HNt (fetched from the operating system 305)—"A16.Replace". The proxy name server 410 then submits the mapping query (always relating to the target hostname HNt) to the name server 405 (action "A17.Submit"). In response thereto, the name server 405 maps the target hostname HNt into the corresponding target address IPt, which is then returned to the proxy name server 410 (action "A18.Map"). The proxy name server 410 in turn forwards the target address IPt to the (dynamic or static) software application 315d,315s that submitted the corresponding mapping query ("Action A19.Return"). The operation of the software applications 315d,315s is then exactly as described above.

Naturally, in order to satisfy local and specific requirements, a person skilled in the art may apply to the above described embodiments many logical and/or physical modifications and alterations. More specifically, although the embodiments have been described with a certain degree of particularity with reference to one or more embodiments thereof, it should be understood that various omissions, substitutions and changes in the form and details as well as other embodiments are possible (for example, with respect to numerical values). Particularly, different embodiments may even be practiced without the specific details set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any described embodiment may be incorporated in any other embodiment as a matter of general design choice.

In any case, the terms include, comprise, have and contain (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

The application of the described embodiments is not limited to the software appliances, but it may be extended to whatever software images (for example, only comprising the operating system, or the operating system and the software applications). Moreover, the software images may be deployed onto any virtual or real machines (even not of a cloud computing environment) for whatever purpose (for example, for upgrading its operating system). Similar considerations apply if the same solution is extended to (source and target) machines provided with multiple (virtual or real) network adapters each one with a corresponding address.

The binding of each static software application on the corresponding source socket may be implemented in a different way (even without defining any internal alias for the source address pointing to the target address—for example, by wrapping the networking module).

Even though in the preceding description reference has been made to sockets, IP addresses and port numbers, this is not to be interpreted in a limitative manner. Indeed, the same solution lends itself to be applied to different transport protocols defying corresponding communication endpoints by means of any communication channels on any type of addresses (for example, the UDP, DCCP and SCTP).

The static software applications being listening on the corresponding source sockets may be discovered in any other way (for example, by means of hooking techniques).

In any case, the watching of the source address (to discover each static software application newly listening on the corresponding source socket) may be implemented with any other frequency (even only at the bootstrap of the target machine or only periodically).

The watchdog and/or the broker may be replaced with any equivalent software component (even aggregated into a single software component that both discovers the static software applications and listens on behalf of them without the need of any additional registration operation).

Likewise, the above-described embodiments may be applied to any other type of hostnames (for example, in the NIS, SMB or NetBIOS naming system). The mapping queries (being submitted to whatever name server) may be intercepted in any other way (for example, by means of hooking techniques). The proxy name server (or any equivalent module) may be configured in another way (for example, simply to replace all the hostnames different from the target hostname with it).

In any case, the embodiments addressing the problem of the source hostname is suitable to be used (alone or combined with other additional features) even without the technique addressing the problem of the source address.

In any case, the broker and the watchdog and/or the proxy name server may be instantiated in a different way (for example, by downloading them onto the target server when it is necessary).

The program that implements the proposed solution on the deployment server (or on any equivalent data-processing system) may be implemented as a stand-alone module, as a plug-in for the deployment manager, or even directly in the deployment manager itself. Similar considerations apply to the program that implements each embodiment of the invention on the target server (or any equivalent data-processing system). In both cases, the program may be structured in a different way, or additional modules or functions may be provided. Likewise, the memory structures may be of other types, or may be replaced with equivalent entities (not necessarily consisting of physical storage media). The program may take any form suitable to be used by any data-processing system or in connection therewith (for example, within a virtual machine), thereby configuring the system to perform the desired operations. Particularly, the program may be in the form of external or resident software, firmware, or microcode (either in object code or in source code—for example, to be compiled or interpreted). Moreover, it is possible to provide the program on any computer-usable medium (and particularly as an article of manufacture on a non-transitory medium). The medium may be any element suitable to contain, store, communicate, propagate, or transfer the program. For example, the medium may be of the electronic, magnetic, optical, electromagnetic, infrared, or semiconductor type.

Examples of such medium are fixed disks (where the program may be pre-loaded), removable disks, tapes, cards, wires, fibers, wireless connections, networks, broadcast waves, and the like. Moreover, the described embodiments may be implemented even with a hardware structure (for example, integrated in a chip of semiconductor material), or with a combination of software and hardware suitably programmed or otherwise configured.

Similar considerations apply if the system wherein the above-described solution may be implemented has a different structure or comprises equivalent components, or it has other operative characteristics. In any case, every component thereof may be separated into more elements, or two or more components may be combined together into a singe element. Moreover, each component may be replicated to support the execution of the corresponding operations in parallel. It is also pointed out that (unless specified otherwise) any interaction between different components generally does not need to be continuous, and it may be either direct or indirect through one or more intermediaries.

What is claimed is:

1. A computer program product comprising a non-transitory computer readable storage medium including code executed to reactivate a software image captured from a source machine having a source address on a target machine having a target address by performing operations, the operations comprising:
    discovering a static software application in the software image deployed on the target machine listening on a corresponding selected communication channel of the source address, wherein the static software application is programmed to listen for inbound requests on the source address of the source machine embedded in the static software application, wherein client applications use the target address of the target machine to communicate requests to the static software application, and wherein the static software application listens for inbound requests on the source address when deployed on the target machine;
    registering each selected communication channel of the source address with a broker, wherein the broker listens on each selected communication channel of the target address on behalf of the static software application;
    listening on a corresponding further selected communication channel of the target address;
    re-directing an inbound message directed to the selected communication channel of the target address to the corresponding static software application on the selected communication channel of the source address by forwarding each inbound message directed to each selected communication channel of the target address to the broker for re-directing the inbound message to the corresponding static software application; and
    forwarding each further inbound message directed to each further selected communication channel of the target address to a corresponding dynamic software application.

2. The computer program product of claim 1, wherein the operations further comprise:
    creating an internal alias for the source address pointing to the target address, wherein the internal alias is used internally by the target machine as a valid address;
    binding the static software application to listen on the source address identified by the internal alias; and
    using, by the target machine, the internal alias to discover the static software application bound on the corresponding source address.

3. The computer program product of claim 1, wherein each address is an IP address and each communication channel is a port number.

4. The computer program product of claim 3, wherein the static software application is listening on a source socket identified by the source IP address and the selected port number, wherein the re-directing the inbound message further comprises:
    translating a target socket, identified by the target IP address and the selected port number, of the inbound message directed thereto into the corresponding source socket.

5. The computer program product of claim 1, wherein the discovering further comprises:
    watching the source address to discover the static software application listening on the corresponding communication channel of the source address.

6. The computer program product of claim 5, wherein the watching further comprises:
    scanning all the communication channels of the source address at a bootstrap of the target machine.

7. The computer program product of claim 5, wherein the watching further comprises:
    scanning all the communication channels of the source address periodically.

8. The computer program product of claim 1, wherein the source machine has a source hostname mapped on the source address and the target machine has a target hostname mapped on the target address, wherein the operations further comprise:
    intercepting each mapping query for mapping the source hostname being submitted by a further selected static software application;
    replacing the source hostname with the target hostname in each mapping query;
    mapping the target hostname into the target address in response to each mapping query, and
    returning the target address to the further selected static software application.

9. The computer program product of claim 1, wherein the operations further comprise:
    capturing the software image on the source machine;
    injecting at least one software component into the software image, wherein the at least one software component is executed to perform the operations of discovering the static software application, listening on behalf of the static software application, and redirecting the inbound message; and
    deploying the software image onto the target machine.

10. A system for reactivating a software image captured from a source machine having a source address on a target machine having a target address, comprising:
    a processor; and
    a non-transitory computer readable storage medium having code executed by the processor to perform operations, the operations comprising:
        discovering a static software application in the software image deployed on the target machine listening on a corresponding selected communication channel of the source address, wherein the static software application is programmed to listen for inbound requests on the source address of the source machine embedded in the static software application, wherein client applications use the target address of the target machine to communicate requests to the static software application, and wherein the static software application listens for inbound requests on the source address when deployed on the target machine;
registering each selected communication channel of the source address with a broker, wherein the broker listens on each selected communication channel of the target address on behalf of the static software application;
listening on a corresponding further selected communication channel of the target address;
re-directing an inbound message directed to the selected communication channel of the target address to the corresponding static software application on the selected communication channel of the source address by forwarding each inbound message directed to each selected communication channel of the target address to the broker for re-directing the inbound message to the corresponding static software application; and
forwarding each further inbound message directed to each further selected communication channel of the target address to a corresponding dynamic software application.

11. The system of claim 10, wherein the operations further comprise:
creating an internal alias for the source address pointing to the target address, wherein the internal alias is used internally by the target machine as a valid address;
binding the static software application to listen on the source address identified by the internal alias; and
using, by the target machine, the internal alias to discover the static software application bound on the corresponding source address.

12. The system of claim 10, wherein each address is an IP address and each communication channel is a port number.

13. The system of claim 12, wherein the static software application is listening on a source socket identified by the source IP address and the selected port number, wherein the re-directing the inbound message further comprises:
translating a target socket, identified by the target IP address and the selected port number, of the inbound message directed thereto into the corresponding source socket.

14. The system of claim 10, wherein the discovering further comprises:
watching the source address to discover the static software application listening on the corresponding communication channel of the source address.

15. The system of claim 10, wherein the source machine has a source hostname mapped on the source address and the target machine has a target hostname mapped on the target address, wherein the operations further comprise:
intercepting each mapping query for mapping the source hostname being submitted by a further selected static software application;
replacing the source hostname with the target hostname in each mapping query; mapping the target hostname into the target address in response to each mapping query, and
returning the target address to the further selected static software application.

16. The system of claim 10, wherein the operations further comprise:
capturing the software image on the source machine;
injecting at least one software component into the software image, wherein the at least one software component is executed to perform the operations of discovering the static software application, listening on behalf of the static software application, and redirecting the inbound message; and
deploying the software image onto the target machine.

17. A method for re-activating a software image captured from a source machine having a source address on a target machine having a target address, comprising:
discovering a static software application in the software image deployed on the target machine listening on a corresponding selected communication channel of the source address, wherein the static software application is programmed to listen for inbound requests on the source address of the source machine embedded in the static software application, wherein client applications use the target address of the target machine to communicate requests to the static software application, and wherein the static software application listens for inbound requests on the source address when deployed on the target machine;
registering each selected communication channel of the source address with a broker, wherein the broker listens on each selected communication channel of the target address on behalf of the static software application;
listening on a corresponding further selected communication channel of the target address;
re-directing an inbound message directed to the selected communication channel of the target address to the corresponding static software application on the selected communication channel of the source address by forwarding each inbound message directed to each selected communication channel of the target address to the broker for re-directing the inbound message to the corresponding static software application; and
forwarding each further inbound message directed to each further selected communication channel of the target address to a corresponding dynamic software application.

18. The method of claim 17, further comprising:
creating an internal alias for the source address pointing to the target address, wherein the internal alias is used internally by the target machine as a valid address;
binding each static software application to listen on the source address identified by the internal alias; and
using, by the target machine, the internal alias to discover the static software application bound on the corresponding source address.

19. The method of claim 17, wherein each address is an IP address and each communication channel is a port number.

20. The method of claim 19, wherein the static software application is listening on a source socket identified by the source IP address and the selected port number, wherein the re-directing the inbound message further comprises:
translating a target socket, identified by the target IP address and the selected port number, of the inbound message directed thereto into the corresponding source socket.

21. The method of claim 17, wherein the discovering further comprises:
watching the source address to discover each static software application listening on the corresponding communication channel of the source address.

22. The method of claim 17, wherein the source machine has a source hostname mapped on the source address and the target machine has a target hostname mapped on the target address, further comprising:

intercepting each mapping query for mapping the source hostname being submitted by a further selected static software application;
replacing the source hostname with the target hostname in each mapping query;
mapping the target hostname into the target address in response to each mapping query, and
returning the target address to the further selected static software application.

23. The method of claim 17, further comprising:
capturing the software image on the source machine;
injecting at least one software component into the software image, wherein the at least one software component is executed to perform the operations of discovering the static software application, listening on behalf of the static software application, and redirecting the inbound message; and
deploying the software image onto the target machine.

* * * * *